United States Patent Office 3,207,810
Patented Sept. 21, 1965

3,207,810
UNSATURATED HYDROCARBON PRODUCTION
Laimonis Bajars, Princeton, N.J., assignor to Petro-Tex Chemical Corporation, Houston, Tex., a corporation of Delaware
No Drawing. Filed Dec. 4, 1962, Ser. No. 242,096
9 Claims. (Cl. 260—680)

This application is a continuation-in-part of my copending and now abandoned application Serial No. 72,327, filed November 29, 1960, entitled, "Dehydrogenation Process," which was a continuation-in-part of my application Serial No. 825,656, filed July 8, 1959, entitled, "Dehydrogenation Process," now abandoned. This application is also a continuation-in-part of my copending and now abandoned application Serial No. 145,992, filed October 18, 1961, entitled, "Dehydrogenation of Hydrocarbons," and my copending and now abandoned application Serial No. 145,993, filed October 18, 1961, entitled, "Dehydrogenation Process."

This invention relates to a process for dehydrogenating organic compounds and relates more particularly to the dehydrogenation of aliphatic hydrocarbons of 4 to 6 carbon atoms with oxygen, iodine and a hereinafter defined catalyst.

The dehydrogenation of aliphatic hydrocarbons such as butylenes to butadiene is accomplished commercially by passing butylenes at high temperatures over calcium-nickel-phosphate or iron oxide catalysts. In the case of calcium-nickel phosphate, butadiene is obtained from butylenes at yields of 36 to 40 percent in a cyclic, non-continuous operation. Over iron oxide catalysts, butylenes are converted to butadiene at yields of about 19 percent. While these yields are commercial, it has been a continuing object of those skilled in the art to provide processes with higher yields of butadiene and other unsaturated hydrocarbons.

Iodine has been disclosed for use in the dehydrogenation of hydrocarbons in U.S. Patent 2,890,253. Large quantities of iodine are required according to this patent as the iodine is used as a reactant in the process. According to this patent, normally one atom of iodine reacts with each atom of hydrogen from the hydrocarbon being dehydrogenated. For example, in the dehydrogenation of butane to butadiene, four atoms of iodine react with four atoms of hydrogen to convert butane to butadiene. The patent suggests that the amounts of iodine required in such a reaction may be reduced by adding oxygen to the process; however, the amount of oxygen used must be no greater than one mol of oxygen per atom of iodine present. According to the examples high ratios of iodine are utilized, such as 1.3 mols of iodine per mol of hydrocarbon to be dehydrogenated. The molecular weight of iodine is 254 and this means that the dehydrogenation of butane with 1.3 mols of iodine, 330 pounds of iodine would be charged for each 58 pounds of butane. Because of the corrosive effect of iodine and hydrogen iodide, such reactions have been conducted in quartz or in glass lined reactors.

I have now discovered a greatly improved process which has as one of the advantages increased yields of unsaturated hydrocarbon of 4 to 6 carbons. These results are obtained by dehydrogenating hydrocarbons of 4 to 6 carbon atoms in vapor phase in admixture with critical ratios of oxygen and iodine at elevated temperatures when the partial pressure of the hydrocarbon to be dehydrogenated is equivalent to no greater than 10 inches mercury at a total pressure of approximately 30 inches of mercury absolute or one atmosphere, and a particular catalyst is employed.

The invention is suitably carried out by reacting at a temperature of at least 400° C. the mixture of the hydrocarbon to be dehydrogenated, iodine and oxygen, with the partial pressure of the hydrocarbon to be dehydrogenated being no greater than about 10 inches mercury absolute, in contact with a particular class of metals or metal compounds of the A groups of the Periodic Table. The catalysts are autoregenerative and therefore the process is continuous.

In a typical embodiment of the invention, butene-2 in vapor phase is mixed with oxygen at a molar ratio of one mol of butene-2 to 0.85 mol of oxygen, iodine in the form of hydrogen iodide at a molar ratio of one mol of butene-2, to 0.017 mol of iodine and steam in a molar ratio of 16 mols of steam to 1 mol of butene-2, and is reacted in the presence of stannic oxide at a temperature of 700° C., at atmospheric pressure and a butene flow rate of 1 liquid v./v./hr. Under these reaction conditions a yield of butadiene-1,3 from butenes of 70 percent per pass is obtained at a conversion of 88 percent and selectivity of 80 percent. The hydrogen iodide by-product is readily separated from the butadiene-1,3 which is thereafter purified as by fractionation. Not only is the unexpectedly high selectivity and conversion of economic advantage for most efficient utilization of feed stock, as compared to prior art processes, but straightforward and efficient purification of the desired butadiene-1,3 is readily accomplished because of the high yield of butadiene-1,3 and the low concentration of impurities which have to be removed. In the present commercial processes, a series of prefractionation, extractive distillation and final fractionation steps are required to isolate butadiene from process streams in sufficient high purity for commercial use because of the low conversion of butylenes, and the resulting large amounts of difficult-to-separate impurities. An advantage of the process of this invention is that less tars and polymer are formed compared to suggested prior art processes.

One essential feature of the process of this invention is that the reaction be conducted in the presence of a metal or metal compound of the Periodic Table Groups IVA and VA or mixtures thereof. The groups are based on the conventional long form of the Periodic Table as found on pages 400 and 401 of the 39th edition (1957–58) of the Handbook of Chemistry and Physics (Chemical Rubber Publishing Company). The metals of the Groups IVA and VA and compounds thereof such as the salts, oxides, or hydroxides are effective catalysts. The metals of Groups IVA and VA are germanium, tin, lead, antimony and bismuth. Particularly effective are inorganic compounds such as the oxides, phosphates, and the halides, such as the iodides, bromides, chlorides and fluorides. Useful catalysts are such as germanium bromide, antimony oxide, germanium dioxide, stannic oxide, stannous iodide, vanadium pentoxide, bismuth iodide, bismuth phosphate, bismuth trioxide, lead acetate, lead iodide, lead oxychloride, lead-mono-oxide. Mixtures of the metal or metal compounds may be used, such as a mixture of two or more compounds from Group IVA, or a mixture of one or more compounds from Group IVA together with one or more compounds from Group VA. Also mixtures of salts, such as halides, and oxides may be employed. Excellent catalysts are those comprising atoms of tin, antimony and bismuth, such as the oxides, phosphates, iodides, bromides, chlorides or fluorides of these elements. Many of the salts, oxides and hydroxides of the metals may change during the preparation of the catalyst, during heating in a reactor prior to use in the process of this invention, or are converted to another form under the described reaction conditions, but such materials still function as an effective compound in the defined process. For example, many of the metal nitrates, nitrites, carbonates, hydroxides, acetates, sulfites, sulfides and the like may be converted to the corresponding oxide or iodide under the reaction conditions defined herein. Compounds which are stable or partially stable at the defined reaction temperatures are likewise effective under the conditions of the described reaction, as well as such compounds which are converted to another form in the reactor. At any rate, the catalysts are effective if the Group IVA or VA metal atoms are present in a catalytic amount in contact with the reaction gases. The metal oxides represent a useful class of materials, since they are inexpensive and are readily formed into pellets or deposited on carriers, and may be readily formed in situ from various salts and hydroxides.

The total pressure on systems employing the process of this invention normally will be about or in excess of atmospheric pressure, although subatmospheric pressure can be used. Higher pressures, such as about 100 to 200 p.s.i.g. may be used. However, the initial partial pressure of the hydrocarbon to be dehydrogenated is an important and critical feature of the invention. The partial pressure of the hydrocarbon to be dehydrogenated should be equivalent to below about 10 inches mercury absolute, or 1/3 atmosphere, when the total pressure is one atmosphere to realize the advantages of this invention. Also because the initial partial pressure of the hydrocarbon to be dehydrogenated is equivalent to less than about 10 inches of mercury at a total pressure of one atmosphere, the combined partial pressure of the hydrocarbon to be dehydrogenated plus the dehydrogenated hydrocarbon will also be equivalent to less than about 10 inches of mercury. For example, if butene is being dehydrogenated to butadiene, at no time will the combined partial pressure of the butene and butadiene be greater than equivalent to about 10 inches of mercury at a total pressure of one atmosphere. Preferably the hydrocarbon to be dehydrogenated should be maintained at a partial pressure equivalent to less than one-third the total pressure, such as no greater than six inches or no greater than four inches of mercury, at a total pressure of one atmosphere. The desired pressure is obtained and maintained by techniques including vacuum operations, or by using helium, organic compounds, nitrogen, steam and the like, or by a combination of these methods. Steam is particularly advantageous and it is surprising that the desired reactions to produce high yields or product are effected in the presence of large amounts of steam. When steam is employed, the ratio of steam to hydrocarbon to be dehydrogenated is normally within the range of about 4 to 20 or 30 mols of steam per mol of hydrocarbon, and generally will be between 8 and 15 mols of steam per mol of hydrocarbon. When air is employed as the source of oxygen, then less steam normally will be required. The degree of dilution of the reactants with steam, nitrogen and the like is related to keeping the partial pressure of hydrocarbon to be dehydrogenated in the system equivalent to preferably below 10 inches of mercury at one atmosphere total pressure. For example, in a mixture of one mol of butene, three mols of steam and one mol of oxygen under a total pressure of one atmosphere the butene would have an absolute pressure of one-fifth of the total pressure, or roughly six inches of mercury absolute pressure. Equivalent to this six inches of mercury butene absolute pressure at atmospheric pressure would be butene mixed with oxygen and iodine under a vacuum such that the partial pressure of the butene is six inches of mercury absolute. A combination of a diluent such as steam together with a vacuum may be utilized to achieve the desired partial pressure of the hydrocarbon. For the purpose of this invention, also equivalent to the six inches of mercury butene absolute pressure at atmospheric pressure would be the same mixture of one mol of butene, three mols of steam and one mol of oxygen under a total pressure greater than atmospheric, for example, a total pressure of 15 or 20 inches mercury above atmospheric. Thus, when the total pressure on the reaction zone is greater than one atmosphere, the absolute values for the pressure of butene will be increased in direct proportion to the increase in total pressure above one atmosphere. Another feature of this invention is that the combined partial pressure of the hydrocarbon to be dehydrogenated plus the iodine liberating material will also be equivalent to less than 10 inches of mercury, and preferably less than 6 or 4 inches of mercury, at a total pressure of one atmosphere. The lower limit of hydrocarbon partial pressure will be dictated by commercial considerations and practically will be greater than about 0.1 inch mercury.

The minimum amount of oxygen used generally will be from about one-fourth mol of oxygen per mol of hydrocarbon to be dehydrogenated to about 2 mols or more of oxygen per mol of hydrocarbon, as much as 5 mols have been employed. Optimum selectivity has been obtained when amounts of oxygen from about 0.25 to about 1 mol of oxygen per mol of hydrocarbon to be dehydrogenated were employed. High conversions have been obtained when the amount of oxygen was varied from about 0.75 to about 1.75 mols of oxygen per mol of hydrocarbon to be dehydrogenated. High yields of unsaturated hydrocarbon product have been obtained with amounts of oxygen from about 0.4 to about 1.25 mols of oxygen per mol of hydrocarbon to be dehydrogenated, so that within the range of 0.25 or 0.35 to 1.75 mols of oxygen per mol of hydrocarbon to be dehydrogenated, economic and operational considerations will dictate the exact molar ratio of hydrocarbon to oxygen used. A particularly useful range is from about one-half to one mol of oxygen per mol of hydrocarbon to be dehydrogenated. Oxygen is supplied to the system as pure oxygen or may be diluted with inert gases such as helium, carbon dioxide and nitrogen as air. In relation to iodine, the amount of oxygen employed preferably will be greater than 2 gram mols of oxygen per gram mol of iodine and normally will be greater than 4 gram mols of oxygen per gram mol of iodine. Usually the ratio of the mols of oxygen to the mols of iodine will be from 5 or 8 to 500 and preferably will be between 15 and 300 mols of oxygen per mol of iodine.

Iodine employed in the process of this invention may be iodine itself, hydrogen iodide, or other inorganic iodides, organic iodides or any iodine containing compound which decomposes under the reaction conditions defined herein to provide free iodine or hydrogen iodide. Such organic iodine compounds may include aliphatic iodides including alkyl iodides such as methyl iodide, ethyl iodide, propyl iodide, butyl iodide, amyl iodide, hexyl iodide, octyl iodide, iodoform and the like. Both primary, secondary and tertiary alkyl iodides may be employed. Similarly, aromatic and heterocyclic iodides may be employed, for example, phenyliodide, benzyl iodide, cyclohexyl iodide, and the like. Additional iodine compounds are iodohydrins such as ethylene iodohydrins; iodo substituted aliphatic acids such as iodoacetic acid; organic amine iodide salts of the general formula $R_xN \cdot HI$, wherein R is a hydrocarbon radical containing from 1 to 8 carbon atoms such as methyl amine hydroiodide; volatile metalloid iodides such as $AsI_3$; and other iodine compounds such as $SI_4$, $SI_6$, $SOI_2$, $IO_2$, $I_2O_5$, $CHI_3$, $CI_4$, and the like. Preferred, of course, among the organic iodides, for ease of handling are the alkyl iodides of 1 to 6 carbon atoms. Generally the iodine compound will have a boiling or decomposition point of less than 400° C. Preferred are iodine and/or hydrogen iodide. It is an advantage of this invention that hydrogen iodide may be employed as the iodine source, with one advantage being that the hydrogen iodide in the effluent from the reactor may be fed directly back to contact the hydrocarbons in the dehydrogenation reactor without any necessity of converting the hydrogen iodide to iodine. It is understood that when a quantity of iodine is referred to herein, both in the specification and the claims, that this refers to the calculated quantity of iodine in all forms present in the vapor space under the conditions of reaction regardless of the initial source or the form in which the iodine is present. For example, a reference to 0.05 mol of iodine would refer to the quantity of iodine present whether the iodine was fed as 0.05 mol of $I_2$ or 0.10 mol of HI.

The iodine concentration normally will be varied from at least about 0.001 mol, such as at least 0.0001 mol, to about 0.2 mol of iodine per mol of hydrocarbon to be dehydrogenated. It is preferred to use less than 0.1 mol of iodine per mol of hydrocarbon to be dehydrogenated Amounts of iodine between 0.005 and 0.08 or 0.09 mol of iodine per mol of hydrocarbon to be dehydrogenated are preferred. A suitable ratio is between about 0.01 and 0.05 mol of iodine per mol of hydrocarbon to be dehydrogenated. It is one of the advantages of this invention that in accordance with the defined process, very small amounts of iodine may be used in the dehydrogenation of aliphatic hydrocarbons as compared to prior art processes. Preferably the iodine will be present in an amount no greater than 5 to 10 mol percent of the total feed to the dehydrogenation zone.

Hydrocarbons to be dehydrogenated according to the process of this invention are aliphatic hydrocarbons of 4 to 6 carbon atoms and preferably are selected from the group consisting of mono-olefins or diolefins of 4 to 6 carbon atoms, saturated aliphatic hydrocarbons of 4 to 5 carbon atoms and mixtures thereof. Examples of feed materials are butene-1, cisbutene-2, transbutene-2, 2-methyl butene-3, 2-methyl butene-1, 2-methyl butene-2, n-butane, isobutane, butadiene-1,3, methyl butane, 2-methyl pentene-1, 2-methyl pentene-2 and mixtures thereof. For example, n-butane may be converted to a mixture of butene-1 and butene-2 or may be converted to a mixture of butene-1, butene-2 and/or butadiene-1,3. A mixture of n-butane and butene-2 may be converted to butadiene-1,3 or a mixture of butadiene-1,3 together with some butene-2 and butene-1. n-Butane, butene-1, butene-2 or butadiene-1,3 or mixtures thereof may be converted to vinyl acetylene. The reaction temperature for the production of vinyl acetylene is normally within the range of about 600° C. to 1000° C. such as between 650° C. and 850° C. Isobutane may be converted to isobutylene. The 2-methyl butenes such as 2-methyl butene-1 may be converted to isoprene. Excellent starting materials are the four carbon hydrocarbons such as butene-1, cis or trans butene-2, n-butane, and butadiene-1,3 and mixtures thereof. Useful feeds as starting materials may be mixed hydrocarbon streams such as refinery streams. For example, the feed material may be the olefin-containing hydrocarbon mixture obtained as the product from the dehydrogenation of hydrocarbons. Another source of feed for the present process is from refinery by-products. For example, in the production of gasoline from higher hydrocarbons by either thermal or catalytic cracking a predominantly hydrocarbon stream containing predominately hydrocarbons of four carbon atoms may be produced and may comprise a mixture of butenes together with butadiene, butane, isobutane, isobutylene and other ingredients in minor amounts. These and other refinery by-products which contain normal ethylenically unsaturated hydrocarbons are useful as starting materials. Another source of feedstock is the product from the dehydrogenation of butane to butenes employing the Houdry process. Although various mixtures of hydrocarbons are useful, the preferred hydrocarbon feed contains at least 50 weight percent butene-1, butene-2, n-butane and/or butadiene-1,3 and mixtures thereof, and more preferably contains at least 70 percent n-butane, butene-1, butene-2 and/or butadiene-1,3 and mixtures thereof. Any remainder usually will be aliphatic hydrocarbons. Aliphatic hydrocarbons having a straight chain of at least 4 carbon atoms are desirable feed materials. The process of this invention is particularly effective in dehydrogenating aliphatic hydrocarbons to provide a product wherein the major unsaturated product has the same number of carbon atoms as the feed hydrocarbon.

In the above descriptions of catalyst compositions, the composition described is that of the surface which is exposed in the dehydrogenation zone to the reactants. That is, if a catalyst carrier is used, the composition described as the catalyst refers to the composition of the surface and not to the total composition of the surface coating plus carrier. The catalytic compositions are intimate combinations or mixtures of the ingredients. These ingredients may or may not be chemically combined or alloyed. Inert catalyst binding agents or fillers may be used, but these will not ordinarily exceed about 50 percent or 65 percent by weight of the catalytic surface. The weight percent of the defined catalytic atoms will generally be at least 20 percent, and preferably at least 35 percent of the composition of the catalyst surface exposed to the reaction gases.

The amount of solid catalyst utilized may be varied depending upon such variables as the activity of the catalyst, the amount of iodine and oxygen used, the flow rates of reactants and the temperature of reaction. The amount of catalyst will be present in an amount of greater than 10 square feet of catalyst surface per cubic foot of reaction zone containing catalyst. Generally the ratios will be at least 25 or 40 square feet of catalyst surface per cubic foot of reaction zone. The catalyst is more effectively utilized when the catalyst is present in an amount of at least 75 square feet of catalyst surface per cubic foot of reaction zone containing catalyst, and preferably the ratio of catalyst surface to volume will be at least 120 square feet of catalyst surface per cubic foot of reaction zone containing catalyst. Of course, the amount of catalyst surface may be much greater when irregular surface catalysts are used. When the catalyst is in the form of particles, either supported or unsupported, the amount of catalyst surface may be expressed in terms of the surface area per unit weight of any particular volume of catalyst particles. The ratio of catalytic surface to weight will be dependent upon various factors including the particle size, particle distribution, apparent bulk density of the particles, amount of active catalyst coated on the carrier, density of the carrier, and so forth. Typical values for the surface of weight ratio are such as about ½ to 200 square meters per gram,[1] although higher and lower values may be used.

Excellent results have been obtained by packing the reactor with catalyst particles as the method of introducing the catalytic surface. The size of the catalyst particles may vary widely but generally the maximum particle size will at least pass through a Tyler Standard screen which has an opening of 2 inches, and generally the largest particles of catalyst will pass through a Tyler screen with one inch openings. Very small particle size carriers may be utilized with the only practical objection being that extremely small particles cause excessive pressure drops across the reactor. In order to avoid high pressure drops across the reactor generally at least 50 percent by weight of the catalyst will be retained by a 10 mesh Tyler Standard screen which has openings of 1/16 inch. However, if a fluid bed reactor is utilized, catalyst particles may be quite small, such as from about 10 to 300 microns. Thus, the particle size when particles are used preferably will be from about 10 microns to a particle size which will pass through a Tyler screen with openings of 2 inches. If a carrier is used the catalyst may be deposited on the carrier by methods known in the art such as by preparing an aqueous solution or dispersion of the catalytic material mixing the carrier with the solution or dispersion until the active ingredients are coated on the carrier. The coated particles may then be dried, for example, in an oven at about 110° C. Various other methods of catalyst preparation known to those

---

[1] As measured by the Innes Nitrogen Absorption Method on a representative unit volume of catalyst particles. The Innes method is reported in Innes, W.B. Anal. Chem., 23, 759 (1951).

skilled in the art may be used. When carriers are utilized, these will be approximately of the same size as the final coated catalyst particle, that is, for fixed bed processes the carriers will generally be retained on 10 mesh Tyler screen and will pass through a Tyler screen with openings of 2 inches. Very useful carriers are Alundum, silicon carbide, Carborundum, pumice, kieselguhr, asbestos, and the like. The Alundums or other alumina carriers are particularly useful. When carriers are used, the amount of catalyst on the carrier will generally be in the range of about 5 to 75 weight percent of the total weight of the active catalytic material plus carrier. The carriers may be of a variety of shapes, including irregular shapes, cylinders or spheres. Another method for introducing the required surface is to utilize as a reactor a small diameter tube wherein the tube wall is catalytic or is coated with catalytic material. If the tube wall is the only source of catalyst generally the tube will be of an internal diameter of no greater than one inch such as less than ¾ inch in diameter or preferably will be no greater than about ½ inch in diameter. Other methods may be utilized to introduce the catalytic surface such as by the use of rods, wires, mesh or shreds and the like of catalytic material. The technique of utilizing fluid beds lends itself well to the process of this invention.

The temperature at which the reaction is conducted is from above 400° C. or 450° C. to temperatures as high as 800° C. or 1000° C. or higher. Excellent results are ordinarily obtained within the range of about 425° C. to about 800° C. or 850° C. Butadiene-1,3 has been obtained in good yields from butene at about 550° C. to about 750° C., and isoprene has been obtained in good yield from methyl butene at temperatures from about 425° C. to 550° C. or 625° C. Vinyl acetylene is produced in good yields from butane, butene-1, butene-2, butadiene-1,3 and mixtures thereof at temperatures above 600° C., such as above 650° C. The temperatures are measured at the maximum temperature in the reactor. An advantage of this invention is the extremely wide latitude of reaction temperatures.

The flow rates of the gaseous reactants may be varied quite widely and can be readily established by those skilled in the art. Good results have been obtained with flow rates of the hydrocarbon to be dehydrogenated ranging from about one-fourth to three or higher liquid volumes of hydrocarbon to be dehydrogenated per volume of reactor containing catalyst per hour. Generally, the flow rates will be within the range of about 0.10 to 25 or higher liquid volumes of the hydrocarbon to be dehydrogenated, calculated at standard conditions of 25° C. to 760 mm. of mercury per volume of reactor space containing catalyst per hour (referred to as either LHSV or liquid v./v./hr.). Usually the LHSV will be between 0.15 and 15. The volume of reactor containing catalyst is that volume of reactor space excluding the volume displaced by the catalyst. For example, if a reactor has a particular volume of cubic feet of void space, when that void space is filled with catalyst particles the original void space is the volume of reactor containing catalyst for the purpose of calculating the flow rates. The residence or contact time of the reactants in the reaction zone under any given set of reaction conditions depends upon all the factors involved in the reaction. Contact times ranging from about 0.1 to about 5 to 10 seconds have been found to be satisfactory. However, a wider range of residence times may be employed which may be as low as about 0.001 to 0.01 second to as long as several minutes, as high as about 3 minutes, although such long reaction times are not preferred. Normally, the shortest contact time consonant with optimum yields and operating conditions is desired. Residence time is the calculated dwell time of the reaction mixture in the reaction zone assuming the mols of product mixture are equivalent to the mols of feed mixture. For the purpose of calculation of residence times the reaction zone is the portion of the reactor packed with the catalyst.

A variety of reactor types may be employed. For example, tubular reactors may be employed. Fixed bed reactors containing the catalysts in the form of grids, screens, pellets, with or without supports and the like may also be used. In any of these reactors suitable means for heat control should be provided. Fluid and moving bed systems are readily applied to the processes of this invention.

The manner of mixing the iodine or iodine compound, the hydrocarbon to be dehydrogenated, oxygen, and steam, if employed, is subject to some choice. In normal operations the hydrocarbon to be dehydrogenated may be preheated and mixed with steam and preheated oxygen or air and iodine or hydrogen iodide are mixed therewith prior to passing the stream in vapor phase over the catalyst bed. Hydrogen iodide or a source of iodine may be dissolved in water and may be mixed with steam or air prior to reaction. Any of the reactants may be split and added incrementally. For example, part of the iodine may be mixed with the hydrocarbon to be dehydrogenated and the oxygen. The mixture may then be heated to effect some dehydrogenation and thereafter the remainder of the iodine added to effect further dehydrogenation. The reactor may be of any type. Conventional reactors used for the preparation of unsaturated hydrocarbons are satisfactory and the reactor may be packed or unpacked. The effluent reaction product from the reactor is cooled and then passed to means for removing iodine such as in a caustic scrubber. The hydrocarbon product is then suitably purified as by fractionation to obtain the desired high purity unsaturated product. The effluent reaction product from the reactor is cooled and then is passed to means for removing hydrogen iodide which normally will represent much of the iodine present during the course of the reaction, and the hydrocarbon product is then suitably purified as by fractionation to obtain the desired high purity butadiene or isoprene.

According to this invention the catalyst is autoregenerative and thus the process is continuous. Little or no energy input is required for the process and it may be operated essentially adiabatically. Moreover, small amounts of tars and polymers are formed as compared to prior art processes suggesting the use of large amounts of iodine.

In the following examples will be found specific embodiments of the invention and details employed in the practice of the invention. Percent conversion refers to the mols of olefin consumed per 100 mols of olefin fed to the reactor, percent selectivity represents the mols of diolefin formed per 100 mols of olefin consumed, and percent yield refers to the mols of diolefin formed per mol of olefin fed. All quantities of iodine expressed are calculated as mols of $I_2$.

*Examples 1 to 3*

A Vycor [1] reactor which was filled with Vicor Raschig rings having deposited thereon the hereinafter designated metal compounds was heated by means of an external electric furnace. At a 700° C. furnace temperature, in a series of runs, a butene-2 flow rate was maintained at 1 LHSV, mixed with oxygen and steam at mol ratios of butene to steam to oxygen of 1 to 16 to 0.85. Hydrogen iodide was added as concentrated 47 percent acid at 3.75 cubic centimeters per hour which was equivalent to 0.017 mol of iodine per mol of butene-2. When the reactor was filled with clean Vycor Raschig rings and operated as described a yield of butadiene-1, 3 of 24 percent was obtained. When this reaction was repeated in the absence of hydrogen iodide, the yield of butadiene obtained was 18 percent. The reactor was then filled with Vycor Raschig rings having deposited thereon the hereinafter ---
[1] The Vycor used was a 96 percent silica glass.

designated metal compounds. The results obtained are in tabular form reported as mol percent conversion, selectivity and yield of butadiene-1, 3 per pass.

| Coating | Conversion, percent | Selectivity, percent | Yield butadiene, percent |
|---|---|---|---|
| Tin oxide | 88 | 80 | 70 |
| Bismuth oxide | 98 | 85 | 83 |
| Antimony oxide | 94 | 70 | 66 |

From the foregoing description of the invention, it will be seen that a novel and greatly improved process for producing unsaturated hydrocarbons is provided. Other examples could be devised for a process whereby the catalyst contained the described elements; preferably with the described elements constituting greater than or at least fifty atomic weight percent of any metal atoms in the surface exposed to the reaction gases. The described catalysts may be activated or promoted as disclosed in my copending and now abandoned applications Serial Number 156,953 and Serial Number 156,956, both filed December 4, 1961. Although representative embodiments of the invention have been specifically described, it is not intended or desired that the invention be limited solely thereto since it will be apparent to those skilled in the art that modifications and variations may be made without departing from the spirit and scope of the invention.

I claim:

1. The method for dehydrogenating aliphatic hydrocarbons which comprises heating in the vapor phase at a temperature of at least about 450° C. an aliphatic hydrocarbon selected from the group consisting of n-butane, n-butene, methyl butene, and mixtures thereof, with oxygen in a molar ratio of about 0.25 to about 1.75 mol of oxygen per mol of said aliphatic hydrocarbon, iodine in a molar ratio of at least about 0.001 to 0.05 mol of iodine per mol of said aliphatic hydrocarbon, the partial pressure of the said aliphatic hydrocarbon being equivalent to no greater than 6 inches of mercury at a total pressure of one atmosphere, with a catalyst comprising bismuth oxide, the ratio of the mols of said oxygen to the mols of said iodine being greater than two, with bismuth constituting at least fifty atomic weight percent of any metal atoms in the catalytic surface exposed to the reaction gases.

2. The method of claim 1 wherein the said aliphatic hydrocarbon is n-butene.

3. The method for dehydrogenating aliphatic hydrocarbons which comprises heating in the vapor phase at a temperature greater than 400° C. an aliphatic hydrocarbon of 4 to 6 carbon atoms with oxygen in a molar ratio of greater than one-fourth mol of oxygen per mol of said aliphatic hydrocarbon, from 0.001 to 0.05 mol of iodine per mol of said aliphatic hydrocarbon, the initial partial pressure of said aliphatic hydrocarbon being equivalent to no greater than about 10 inches of mercury at one atmosphere total pressure with a solid inorganic catalyst comprising a salt of bismuth, with bismuth constituting at least fifty atomic weight percent of any metal atoms in the surface exposed to the reaction gases.

4. The method of claim 3 wherein the aliphatic hydrocarbon is n-butene and the oxygen is present in a molar ratio of about 0.4 to about 1.75 mols of oxygen per mol of butene.

5. The method for dehydrogenating aliphatic hydrocarbons which comprises heating in the vapor phase at a temperature of at least about 450° C. an aliphatic hydrocarbon selected from the group consisting of n-butane, n-butene, methyl butene, and mixtures thereof with oxygen in a molar ratio of about 0.25 to about 1.75 mol of oxygen per mol of said aliphatic hydrocarbon, iodine in a molar ratio of at least about 0.001 to 0.005 mol of iodine per mol of said aliphatic hydrocarbon, the partial pressure of the said aliphatic hydrocarbon being equivalent to no greater than 6 inches of mercury at a total pressure of one atmosphere, with a catalyst comprising tin oxide, the ratio of the mols of said oxygen to the mols of said iodine being greater than two, with tin constituting at least fifty atomic weight percent of any metal atoms in the surface exposed to the reaction gases.

6. The method of claim 5 wherein the said aliphatic hydrocarbon is n-butene.

7. The method for dehydrogenating aliphatic hydrocarbons which comprises heating in the vapor phase at a temperature greater than 400° C. an aliphatic hydrocarbon of 4 to 6 carbon atoms with oxygen in a molar ratio of greater than one-fourth mol of oxygen per mol of said aliphatic hydrocarbon, from 0.001 to 0.05 mol of iodine per mol of said aliphatic hydrocarbon, the initial partial pressure of said aliphatic hydrocarbon being equivalent to no greater than about 10 inches of mercury at one atmosphere total pressure with a solid inorganic catalyst comprising a salt of tin, with tin constituting at least fifty atomic weight percent of any metal atoms in the surface exposed to the reaction gases.

8. The method for dehydrogenating aliphatic hydrocarbons which comprises heating in the vapor phase at a temperature of at least about 450° C. butene with oxygen in a molar ratio of about 0.25 to about 1.75 mol of oxygen per mol of said butene, iodine in a molar ratio of at least about 0.001 to 0.05 mol of iodine per mol of said butene, the partial pressure of the said butene being equivalent to no greater than 6 inches of mercury at a total pressure of one atmosphere, with a catalyst comprising antimony oxide, the ratio of the mols of said oxygen to the mols of said iodine being greater than two, with antimony constituting at least fifty atomic weight percent of any metal atoms in the catalytic surface exposed to the reaction gases.

9. The method of claim 7 wherein the aliphatic hydrocarbon is n-butene and the oxygen is present in a molar ratio of about 0.4 to about 1.75 mols of oxygen per mol of butene.

References Cited by the Examiner

UNITED STATES PATENTS

| 2,719,171 | 9/52 | Kalb | 260—680 |
| 2,991,320 | 7/61 | Hearne et al. | 260—680 |
| 3,080,435 | 3/63 | Nager | 260—680 |

PAUL M. COUGHLAN, *Primary Examiner.*

ALPHONSO D. SULLIVAN, *Examiner.*

UNITED STATES PATENT OFFICE
CERTIFICATE OF CORRECTION

Patent No. 3,207,810                              September 21, 1965

Laimonis Bajars

It is hereby certified that error appears in the above numbered patent requiring correction and that the said Letters Patent should read as corrected below.

Column 2, line 12, strike out the comma; column 10, line 12, for "0.005" read -- 0.05 --.

Signed and sealed this 25th day of October 1966.

(SEAL)
Attest:

ERNEST W. SWIDER                          EDWARD J. BRENNER
Attesting Officer                             Commissioner of Patents